(12) United States Patent
Park et al.

(10) Patent No.: US 8,587,713 B2
(45) Date of Patent: Nov. 19, 2013

(54) DIGITAL CAMERA AND METHOD OF CONTROLLING THE SAME THAT CALCULATES NEEDED FLASH EMISSION

(75) Inventors: Sung-ha Park, Suwon-si (KR); Jin-pyo Gwak, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 790 days.

(21) Appl. No.: 12/649,551

(22) Filed: Dec. 30, 2009

(65) Prior Publication Data

US 2010/0165180 A1  Jul. 1, 2010

(30) Foreign Application Priority Data

Dec. 31, 2008  (KR) .................. 10-2008-0138408

(51) Int. Cl.
*H04N 5/222* (2006.01)
(52) U.S. Cl.
USPC .......................... 348/371; 396/182
(58) Field of Classification Search
None
See application file for complete search history.

(56) References Cited

U.S. PATENT DOCUMENTS

| | | | | |
|---|---|---|---|---|
| 5,946,035 A * | 8/1999 | Suh | ............... | 348/371 |
| 7,126,640 B1 * | 10/2006 | Takei | ............. | 348/371 |
| 7,333,144 B2 * | 2/2008 | Kubo | ............. | 348/371 |
| 2002/0018142 A1 * | 2/2002 | Oda | ............... | 348/370 |
| 2004/0109082 A1 * | 6/2004 | Yokonuma | ............ | 348/371 |
| 2004/0119879 A1 * | 6/2004 | Lee | ............... | 348/371 |
| 2005/0157208 A1 * | 7/2005 | Park et al. | .............. | 348/371 |
| 2005/0190287 A1 * | 9/2005 | Ogawa | ........... | 348/370 |
| 2007/0024737 A1 * | 2/2007 | Nakamura et al. | ........... | 348/335 |

* cited by examiner

*Primary Examiner* — James M Hannett
*Assistant Examiner* — Dwight C Tejano
(74) *Attorney, Agent, or Firm* — Drinker Biddle & Reath LLP

(57) ABSTRACT

A digital camera may include a flash unit configured to emit light to illuminate a subject using a preliminary light emission operation followed by a main light emission operation, an image sensor having a pixel array arranged along a plurality of lines, and a digital signal processor. The image sensor may be configured to convert an image of the subject into an electrical signal by reading an image frame corresponding to one screen using the pixel array during the preliminary light emission operation and reading another image frame corresponding to one screen during the main light emission operation. The digital signal processor may be configured to control the light emitting operation of the flash unit to maintain the preliminary light emission from a start to an end of the reading of one image frame.

17 Claims, 9 Drawing Sheets

DIGITAL CAMERA AND METHOD OF CONTROLLING THE SAME THAT CALCULATES NEEDED FLASH EMISSION

CROSS-REFERENCE TO RELATED PATENT APPLICATION

This application claims the priority benefit of Korean Patent Application No. 10-2008-0138408, filed on Dec. 31, 2008, in the Korean Intellectual Property Office, the disclosure of which is incorporated herein in its entirety by reference.

BACKGROUND

1. Field of the Invention

The present invention relates to a digital camera and a method of controlling the same, and more particularly, to a digital camera which is capable of accurately calculating an amount of light needed for photographing a subject and controlling light emission of a flash during the photographing accordingly, and a method of controlling the digital camera.

2. Description of the Related Art

When photographing a subject using a camera, photographing conditions are significantly influenced by an illumination condition surrounding the subject. Thus, if the subject is being photographed in a dark room or at night, a flash is typically operated to generate a large amount of instantaneous light. The brightness of the subject during flash photography is typically controlled according to a time of light emission of the flash, and thus algorithms for controlling the time of light emission of the flash are typically used. In an illumination method which includes one of the light emission controlling algorithms, during the light emission of the flash, the brightness of the subject is measured using an illumination sensor and the light emission of the flash is continued until the brightness of the subject reaches a preset brightness. In a preliminary light emission method which includes another light emission controlling algorithm, a light emission of the flash occurs in advance of photographing the subject to measure brightness of the subject, and a light emission time of a main light emission during photographing of the subject is calculated based on the measured brightness of the subject. However, in the preliminary light emission method, the amount of light of the main light emission may not be accurately calculated due to a shutter type of an image sensor.

SUMMARY

Embodiments of the present invention include a digital camera capable of accurately calculating an amount of light needed for photographing a subject and controlling light emission of a flash during the photographing accordingly, and a method of controlling the digital camera.

An exemplary embodiment of a digital camera may include a flash unit having a light source, an image sensor having a pixel array arranged along a plurality of lines, and a digital signal processor communicatively coupled with the flash unit and the image sensor. The flash unit may be configured to emit light to illuminate a subject using a preliminary light emission operation followed by a main light emission operation. The image sensor may be configured to convert an image of the subject into an electrical signal by reading an image frame corresponding to one screen using the pixel array during the preliminary light emission operation and reading another image frame corresponding to one screen during the main light emission operation. The digital signal processor may be configured to control the light emitting operation of the flash unit to maintain the preliminary light emission from a start to an end of the reading of one image frame.

The digital signal processor may be further configured to synchronize the preliminary light emission operation with the reading operation of the image sensor within the one image frame.

The image sensor may be further configured to perform a reading operation in units of frames in response to a vertical synchronization signal, and to perform a reading operation in units of lines in response to a horizontal synchronization.

The preliminary light emission operation may be started in response to a synchronization pulse of the vertical synchronization signal, and the preliminary light emission operation may be ended in response to a next synchronization pulse.

The light source of the flash unit may comprise a light emitting diode, wherein a light emission time of the light emitting diode is controlled according to connection or blocking of a driving power source. The preliminary light emission operation and the main light emission operation may be performed by operating the light emitting diode.

The light source of the flash unit may comprise a xenon flash having a gas discharge structure and a light emitting diode whose light emission time is controlled according to connection or blocking of a driving power source. The preliminary light emission operation may be performed by operating the light emitting diode, and the main light emission operation may be performed by operating the xenon flash.

The main light emission operation may be performed as a spot light emission operation which is maintained for a shorter time period than the reading operation of an image frame.

The digital signal processor may be further configured to analyze a luminance signal of an image frame obtained by the image sensor during the preliminary light emission operation, and calculate an amount of light required for the main light emission operation.

An exemplary embodiment of a digital camera may include a flash unit having a light source, an image sensor having a pixel array arranged along a plurality of lines, and a digital signal processor communicatively coupled with the flash unit and the image sensor. The flash unit may be configured to emit light to illuminate a subject using a preliminary light emission operation followed by a main light emission operation. The image sensor may be configured to convert an image of the subject into an electrical signal by reading an image frame corresponding to one screen using the pixel array, to perform the reading operation in units of frames in response to a vertical synchronization signal, and to perform the reading operation in units of lines in response to a horizontal synchronization signal. The digital signal processor may be configured to control the light emitting operation of the flash unit to start the preliminary light emission operation at a synchronization pulse of the vertical synchronization signal and end the preliminary light emission operation at a next synchronization pulse.

The preliminary light emission may be uniformly maintained between the synchronization pulses of the vertical synchronization signal.

The main light emission may be performed as a spot light emission operation which is maintained for a shorter time period than a time period between the synchronization pulses of the vertical synchronization signal.

The light source of the flash unit may comprise a xenon flash including a gas discharge structure and a light emitting diode whose light emission time is controlled according to connection or blocking of a driving power source. The preliminary light emission operation may be performed by operating the light emitting diode, and the main light emission operation may be performed by operating the xenon flash.

The digital signal processor may be further configured to analyze a luminance signal of an image frame obtained during the preliminary light emission operation, and calculate an amount of light required for the main light emission operation.

In an exemplary method, a digital camera may be controlled wherein the digital camera includes a flash unit that provides a light source for photographing, and an image sensor that includes a pixel array arranged along a plurality of lines and that is configured to convert an image of the subject into an electrical signal by reading an image frame corresponding to one screen. The method may include starting a preliminary light emission operation of a flash unit, reading an image frame corresponding to one screen using an image sensor while maintaining the preliminary light emission, and ending the preliminary light emission operation. The method may also include calculating an amount of light required for a main light emission operation by analyzing a luminance signal of the image frame and performing a main light emission operation according to the calculated amount of light.

Starting the preliminary light emission operation may be in response to a synchronization pulse of a vertical synchronization signal for starting a reading operation in units of frames, and ending the preliminary light emission operation may be in response to a next synchronization pulse.

Starting the preliminary light emission operation may include connecting a driving power source to a light emitting diode, and ending the preliminary light emission operation may include blocking the driving power source from the light emitting diode.

Performing the main light emission operation may include performing a spot light emission operation which is maintained for a shorter time period than a reading operation of an image frame.

BRIEF DESCRIPTION OF THE DRAWINGS

The above and other features and advantages of the present invention will become more apparent by describing in detail exemplary embodiments thereof with reference to the attached drawings listed below.

DETAILED DESCRIPTION

Embodiments of the present invention will now be described more fully with reference to the accompanying drawings, in which exemplary embodiments of the invention are shown. In this specification, a digital camera refers to any digital mobile device which can be carried by a user and has a photographing function, such as a camcorder, a mobile phone, a personal digital assistant (PDA), and so forth.

Figure 1:
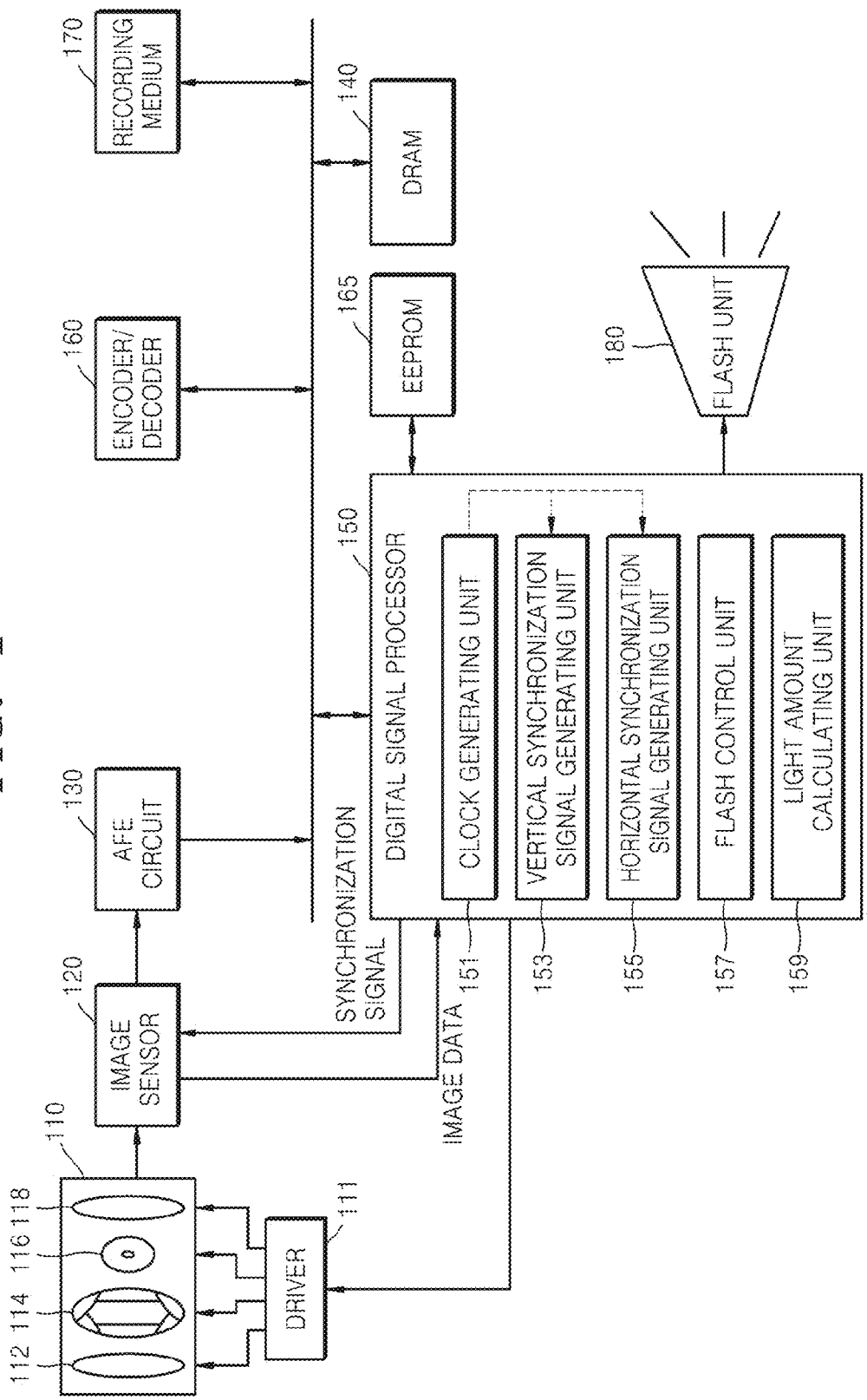
FIG. 1 is a block diagram illustrating a configuration of an exemplary digital camera.

FIG. 1 is a block diagram illustrating a configuration of an exemplary digital camera. Referring to FIG. 1, the exemplary digital camera includes an optical unit 110 which may include a plurality of optical lenses to form a subject image on an image sensor 120, the image sensor 120 which converts the subject image into an electrical image signal, an analog front end (AFE) circuit 130 which processes the electrical image signal output from the image sensor 120 to covert the output signal into a quantized digital image signal, a dynamic random access memory (DRAM) 140 which temporarily stores an image signal to provide a work space for signal processing, a recording medium 170 in which image data of the subject may be stored as an image file, and a digital signal processor 150 which collectively controls each element and the overall data flow of the digital camera.

The optical unit 110 includes a zoom lens 112 which moves forward and backward along an optical axis direction and varies a focal distance, a shutter 114 and an iris 116 which respectively adjust an exposure time of light on the image sensor 120 and an amount of the light incident thereon, and a focus lens 118 which adjusts a focus of a subject image formed by the light on the image sensor 120. The zoom lens 112, the shutter 114, the iris 116, and the focus lens 118 may be driven by an actuating motor (not shown) which may be driven using a driver 111.

The image sensor 120 may include a charged coupled device (CCD) image sensor or a complementary metal oxide semiconductor (CMOS) image sensor. The image sensor 120 may convert the subject image formed thereon into an electrical signal. A plurality of pixel areas may be arranged in a matrix on an image capturing surface of the image sensor 120, and a photo-electric converter such as a photo-diode may be disposed in each pixel area. For example, the image sensor 120 may scan the image capturing surface according to a synchronization signal of the digital signal processor 150 to detect charges accumulated in each photo-electric converter and thus read an image frame corresponding to one screen. The subject image exposed on the image sensor 120 via the shutter 114 and the iris 116 may be read in electrical form through a reading operation of the image sensor 120. Through exposure, the subject image may be received onto the image capturing surface of the image sensor 120, and through reading, the light which forms the subject image exposed on the image capturing surface may be converted to a signal in electrical form. Thus, exposure and reading are distinguished from each other. The image sensor 120 may read a predetermined number of frames per second according to a synchronization signal. For example, the image sensor 120 may read image data at a frame rate of 30 frames per second (FPS).

The AFE circuit 130 may perform a correlated double sampling (CDS) process and an analog digital conversion (ADC) process with respect to an output signal of the image sensor 120. The AFE circuit 130 may transmit an output signal to an encoder/decoder 160. The encoder/decoder 160 may converted the output signal from the AFE circuit 130 into compressed data according to a predetermined compression encoding process such as a joint photographic expert group (JPEG) or a moving picture expert group (MPEG) process. The compressed data may be stored in the recording medium 170. The DRAM 140, which may also include a synchronous DRAM (SDRAM), may provide the encoder/decoder 160 and the digital signal processor 150 with a work space for data processing.

The digital signal processor 150 may execute a program recorded in an electronically erasable and programmable read-only memory (EEPROM) 165 to control the overall operations of the digital camera and conduct various data processing operations. The digital signal processor 150 may include vertical and horizontal synchronization signal generating units 153 and 155, a flash control unit 157, and a light amount calculating unit 159. The vertical and horizontal synchronization signal generating units 153 and 155 may control a reading operation of the image sensor 120. In detail, the vertical synchronization signal generating unit 153 may generate a vertical synchronization pulse that instructs the image sensor 120 to perform a reading operation in units of frames, and the horizontal synchronization signal generating unit 155 may generate a horizontal synchronization pulse that instructs the image sensor 120 to perform a reading operation in units of lines. The vertical and horizontal synchronization signal generating units 153 and 155 may cause a driving clock signal that is generated by a clock generating unit 151 to branch off to generate a synchronization signal, appoint a reading position on the pixel array of the image sensor 120, instruct the image sensor 120 to perform a reading operation of a new frame by outputting a vertical synchronization pulse at the same time as the end of the reading operation of each frame, and instruct the image sensor 120 to perform a reading operation of a next horizontal line by outputting a horizontal synchronization pulse at the same time as the end of the reading operation of a horizontal line.

The flash control unit 157 may control a light emitting operation of a flash unit 180. In dark photographing conditions such as in a dark room or at night, the flash control unit 157 may operate the flash unit 180 according to an illumination condition and quickly generate a large amount of light. The exemplary digital camera may perform a preliminary light emission operation in advance of a main photographing operation and detect reflected light from a subject illuminated by the preliminary light emission, thereby supporting a preliminary light emission method in which an optimum amount of light for a main light emission operation may be calculated. The flash control unit 157 may maintain the preliminary light emission during a reading operation of a frame corresponding to one screen, so that reflected light in the entire region of the subject may be measured and a desired light amount for the main light emission may be accurately calculated. For example, the flash control unit 157 may synchronize the preliminary light emission operation performed by the flash unit 180 with the reading operation of the image sensor 120, thereby constantly maintaining the preliminary light emission during the reading operation of one frame. Meanwhile, the light amount calculating unit 159 may analyze a luminance signal within an image obtained during the preliminary light emission operation, and calculate an optimum amount of light needed for the main light emission operation in order to obtain desired luminance.

Figure 2:
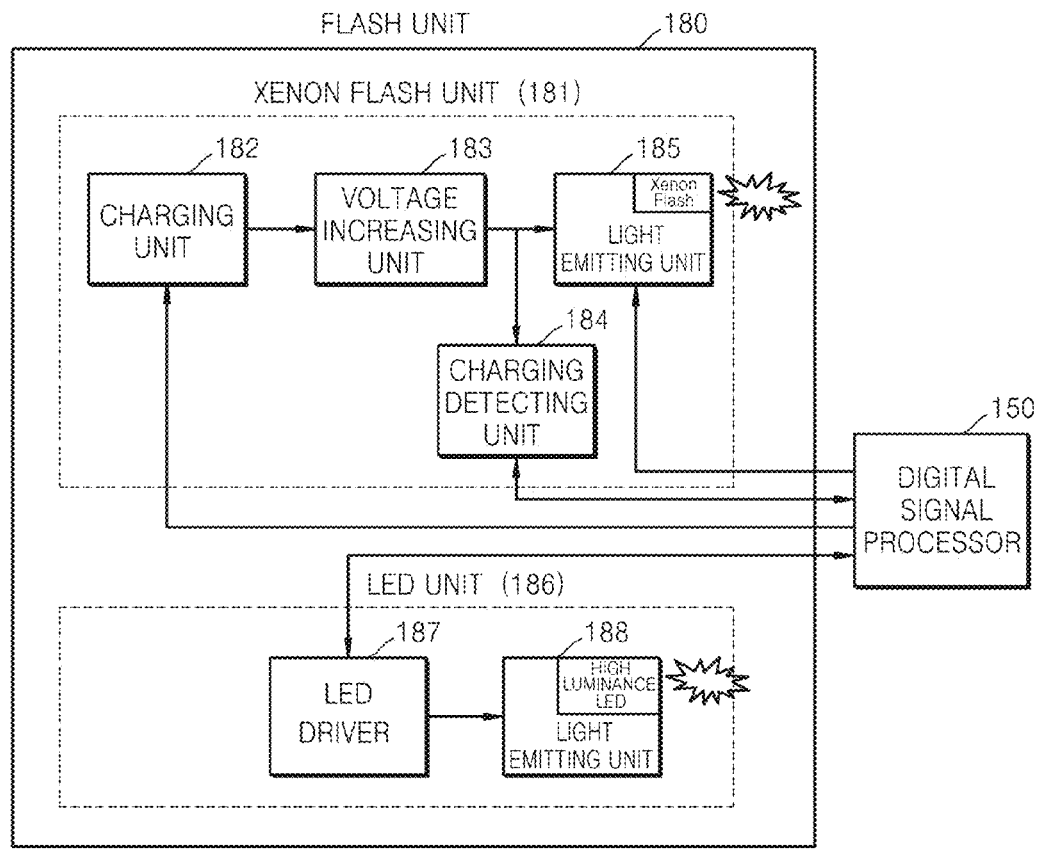
FIGS. 2 and 3 are block diagrams illustrating exemplary configurations of a flash unit.
Figure 3:
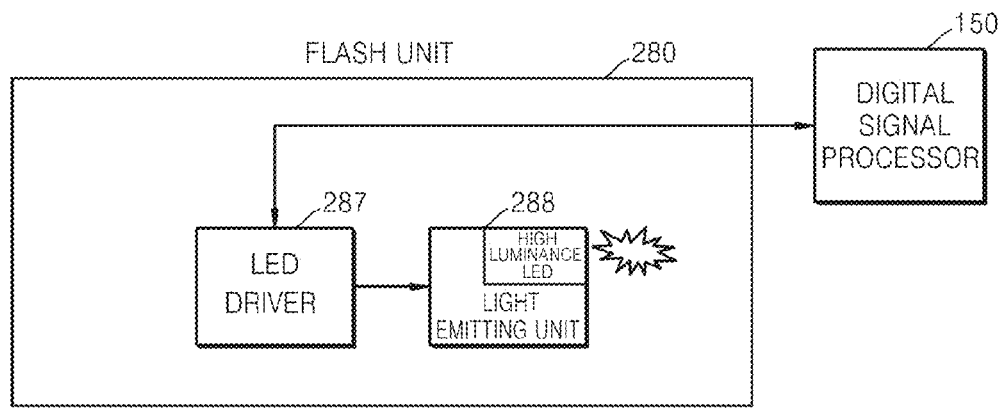

FIGS. 2 and 3 are block diagrams illustrating exemplary configurations of a flash unit. Referring to FIG. 2, the flash unit 180 includes a xenon flash unit 181 as one light source and a light emitting diode (LED) unit 186 as another light source. The xenon flash unit 181 and the LED unit 186 may have different light emission mechanisms. The xenon flash unit 181 may be lighted by an instantaneous discharge of a Strovo capacitor (not shown) that is charged with a high voltage. In detail, the xenon flash unit 181 may include a charging unit 182 that generates a charge current, a voltage increasing unit 183 that increases the charge current to an optimum high voltage, and a light emitting unit 185 that instantaneously discharges the charge current charged in the Strovo capacitor to generate light emission by gas discharge. The xenon flash unit 181 may further include a charging detecting unit 184 that detects a charge voltage of the Strovo capacitor to determine whether charging is finished. The overall operations related to charging and discharging of the xenon flash unit 181 may be controlled by the digital signal processor 150. The LED unit 186 may include a light emitting unit 188 that includes a light emitting diode (e.g., a high luminance LED) and an LED driver 187 that applies a driving signal to the light emitting unit 188. The light emitting unit 188 may start a light emission operation as power is supplied by the LED driver 187, and finish the light emission operation as power is blocked, thereby controlling a time period of light emission. The xenon flash unit 181 may discharge light by gas discharge, and accordingly, high luminance light may be emitted but a light emission time thereof may be short. On the other hand, the LED unit 186 may emit lower luminance light but a light emission time thereof may be longer. In the preliminary light emission operation in which a light emission is maintained for a relatively long time, the LED unit 186 may be operated, and in the main light emission in which a relatively larger amount of light is needed, the xenon flash unit 181 may be operated. Thus, the xenon flash unit 181 and the LED unit 186 may be used in combination according to corresponding conditions for light emission.

In some embodiments, the flash unit 180 illustrated in FIG. 1 may not include the xenon flash unit 181 illustrated in FIG. 1. In these embodiments, the flash unit 180 illustrated in FIG. 1 may include an LED as an only light source, as illustrated in FIG. 3. A flash unit 280 illustrated in FIG. 3 may include a light emitting unit 288 that includes an LED that emits flash light having high luminance according to an electrical control signal and an LED driver 287 that outputs a driving signal to the light emitting unit 288.

Figure 4:
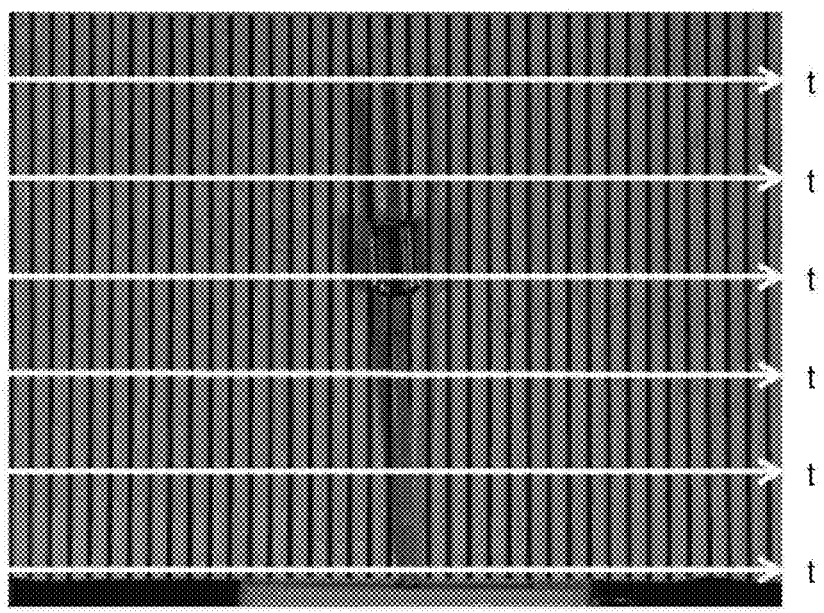
FIG. 4 is a view for explaining an exemplary global shutter operation of an image sensor.

FIG. 4 is a view for explaining an exemplary global shutter operation of the image sensor 120. The exemplary global shutter operation is a uniform synchronous shutter method in which a reading operation with respect to all pixels is performed once to obtain image frame information corresponding to one screen. Accordingly, as illustrated in FIG. 4, if an image capturing operation is started at a time t, all pixels are read at a same time t. For example, a CCD image sensor may be operated in a global shutter method, and a CMOS image sensor may also be operated in a global shutter method in a photographing mode.

Figure 5:
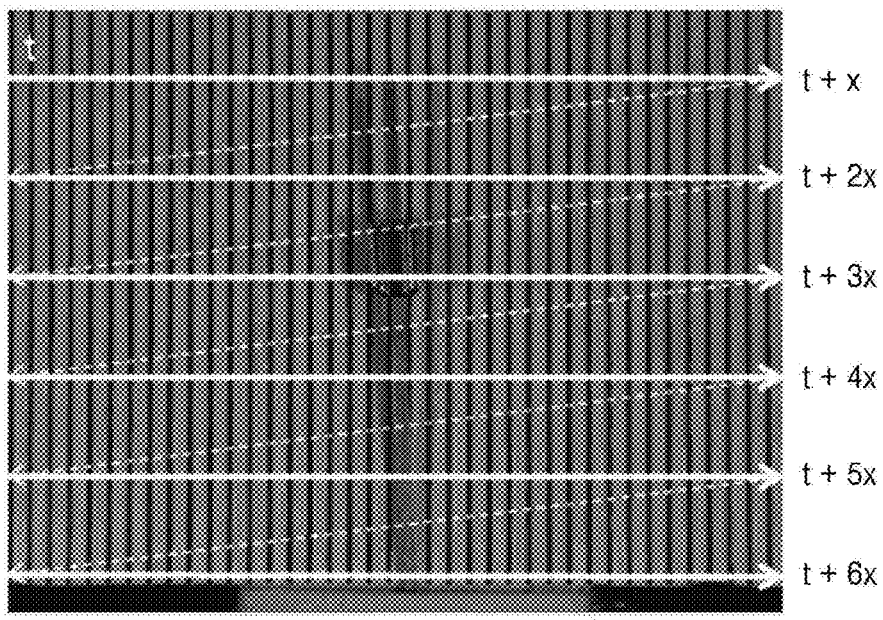
FIG. 5 is a view for explaining an exemplary rolling shutter operation of an image sensor.

FIG. 5 is a view for explaining an exemplary rolling shutter operation of the image sensor 120. In the exemplary roller shutter operation, a reading operation is performed line by line from a first horizontal line to a last horizontal line, thereby scanning an image frame corresponding to one screen. That is, a reading operation for each horizontal line is performed according to a scanning direction, and a next horizontal line is selected according to a horizontal synchronization pulse at the same time with the end of the reading of the horizontal line. For example, as illustrated in FIG. 5, when an image capturing operation starts at a time t, a first horizontal line is read according to the scanning direction. As the reading of the first horizontal line is ended at a time t+x when an incremental period of time x has elapsed, a next horizontal line is selected according to a horizontal synchronization pulse and is read. The reading operation of a second horizontal line is ended at a time t+2x when another incremental period of time x has elapsed, and a third horizontal line is selected to be read. Consequently, reading operations are performed line by line in the rolling shutter operation, and thus reading times for each of the horizontal lines are different from one another. For example, the CMOS image sensor may be operated in the manner of the rolling shutter by including a switching device for each pixel and detecting an accumulated charge by approaching each pixel sequentially. The CMOS image sensor may be operated in a rolling shutter method in a liveview mode before photographing, and may be operated in a global shutter method in a photographing mode.

Figure 6:
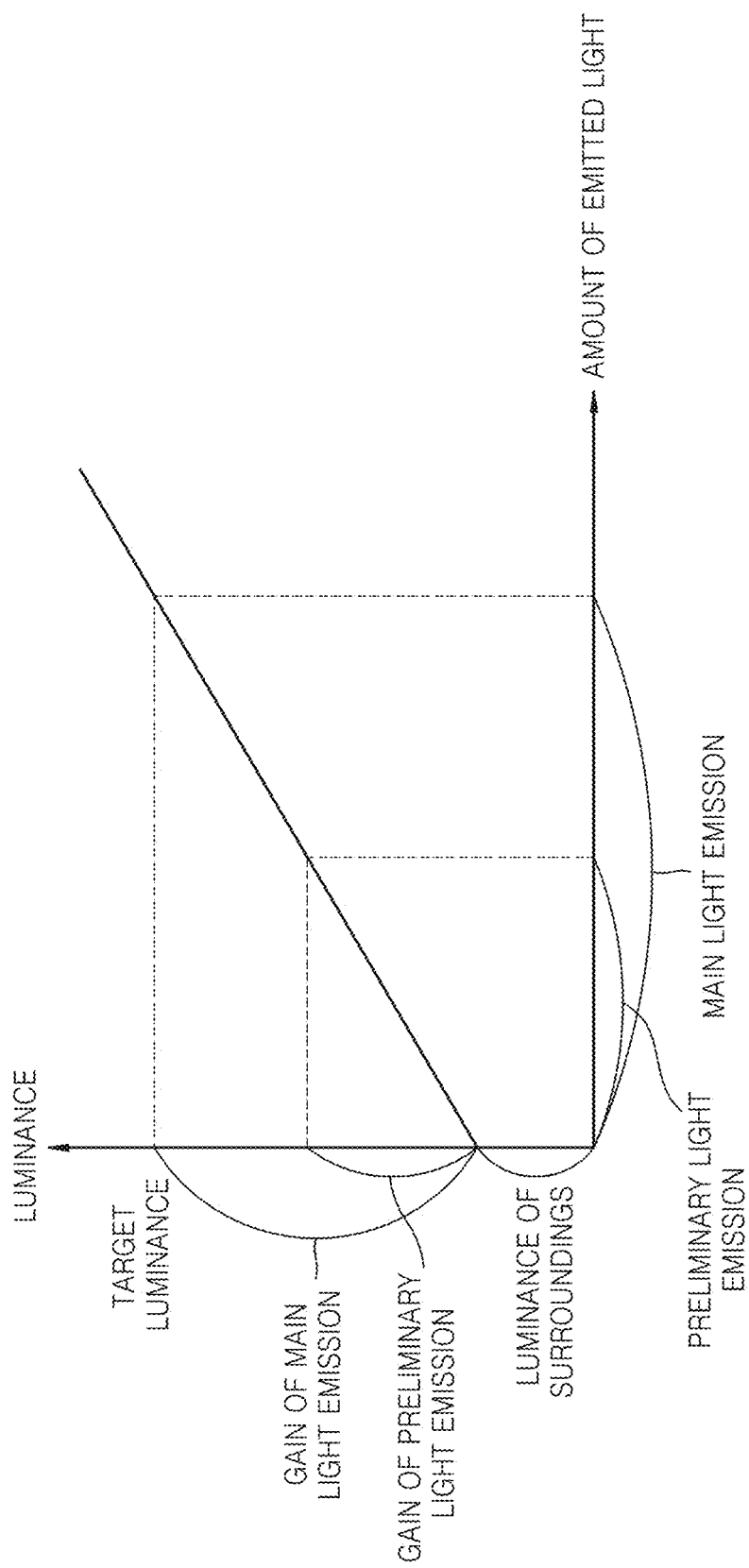
FIG. 6 is a view for explaining an exemplary preliminary light emission operation.

The exemplary digital camera may support the preliminary light emission method in which a flash is operated in advance of a main photographing operation and light reflected by a subject is detected to calculate an optimum amount of light for a main light emission operation. FIG. 6 is a view for explaining an exemplary preliminary light emission operation. Referring to FIG. 6, light may be preliminarily emitted just before a main light emission, and light reflected by the subject due to the preliminary light emission operation may be received to analyze a luminance signal. The brightness of the subject detected during the preliminary light emission operation may include a sum of the brightness of surroundings according to illumination conditions and a luminance gain due to the preliminary light emission operation. Also, a desired amount of light for the main light emission may be calculated to determine a target luminance, for example, from a relationship between the amount of light of a flash and the luminance of the subject.

Figure 7:
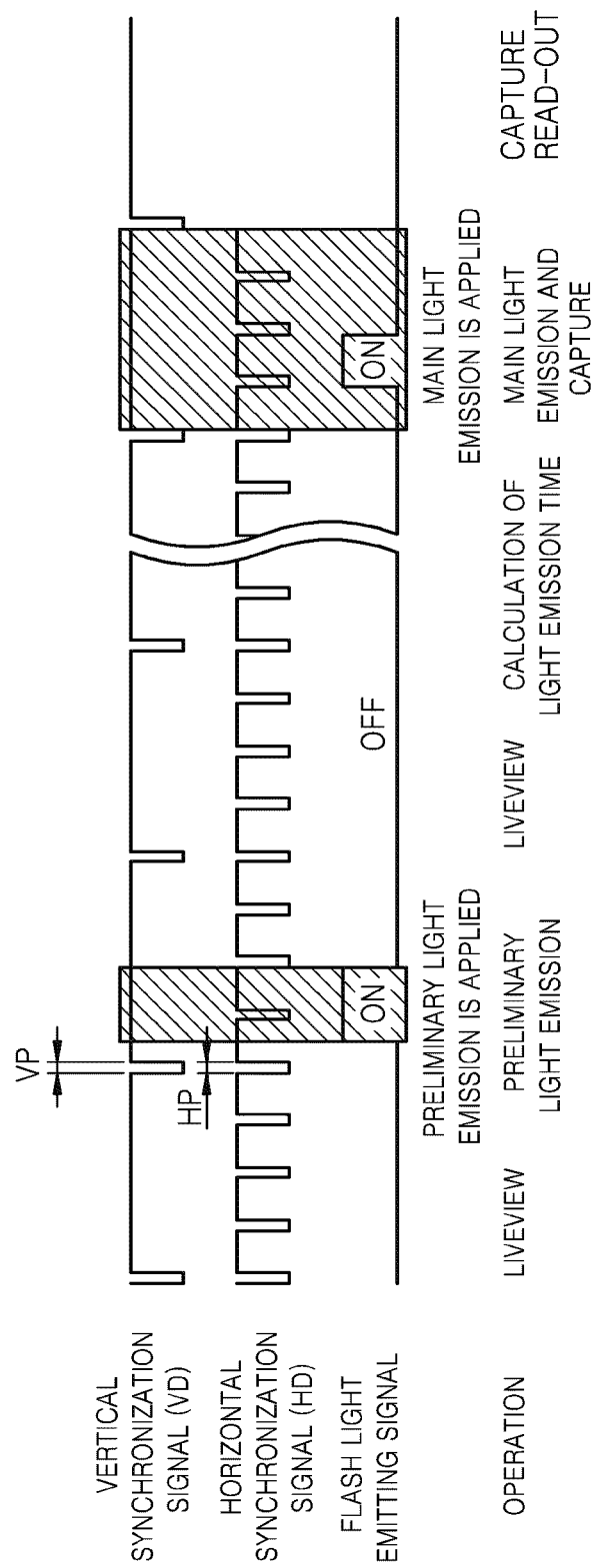
FIG. 7 is a timing diagram of light emission of a flash according to a comparative example in contrast to an embodiment of the present invention.

In the rolling shutter method in which a frame is scanned from top to bottom to sequentially read an accumulative charge of each pixel, if the preliminary light emission operation is performed as a spot light emission operation (e.g., a time duration of the preliminary light emission is shorter than a time required to scan the entire frame), reflected light may be detected only from a portion of the frame that is read during a very short time in which the preliminary light emission is maintained, and reflected light may not be detected from the rest of the frame. Consequently, an amount of light desired for a main light emission operation may not be accurately calculated. FIG. 7 is a timing diagram of light emission of a flash according to a comparative example in contrast to an embodiment of the present invention. A vertical synchronization signal VD is a frame start signal that may instruct the image sensor 120 to start reading one frame, and a horizontal synchronization signal HD is a line start signal that may instruct the image sensor 120 to start reading one horizontal line. For example, during a continuous shot or audio-visual (AV) photographing in which a photographing operation is performed continuously and which accompanies one photographing event, the vertical synchronization signal VD may be converted from high to low at the same time a reading operation of one frame is ended. A vertical synchronization pulse VP may then be generated, thereby instructing the image sensor 120 to perform a reading operation of a new image frame. Also, at the same time as the end of the reading operation of each horizontal line within one frame, the horizontal synchronization signal HD may be converted from high to low and a horizontal synchronization pulse HP may be generated, thereby instructing the image sensor 120 to perform a reading operation of a next horizontal line.

Figure 8:
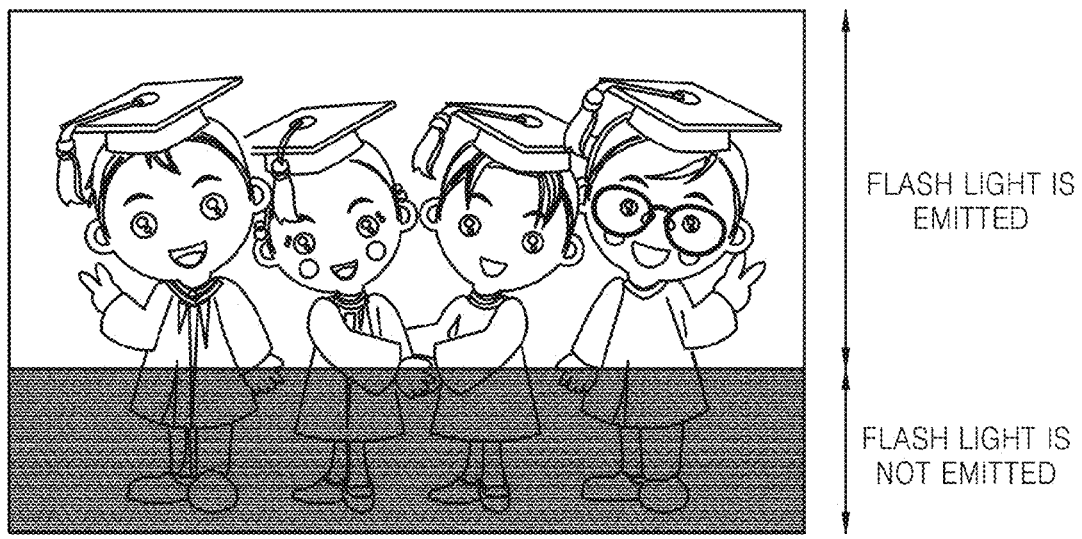
FIG. 8 illustrates an exemplary image obtained during a preliminary light emission operation according to the light emission timing of FIG. 7.

A light emitting operation of the flash unit 180 may be performed using the preliminary light emission method in which a preliminary light emission operation is performed before a photographing operation, and light reflected by a subject may be received to determine a desired light amount for a main light emission operation. The main light emission operation may be performed according to the determined light amount. In the rolling shutter method in which a frame is read sequentially from top to bottom, if a preliminary light emission operation is performed as a spot light emission operation, reflected light may be received only in a portion of the frame which is to be read during a short time in which the preliminary light emission operation is maintained, and reflected light may not be received in the rest of the frame. That is, effects of the preliminary light emission operation may be obtained only in a hatched portion in FIG. 7 corresponding to the application of the preliminary light emission during a reading time of one frame, and the effect of the preliminary light emission operation may not be obtained in other regions. FIG. 8 illustrates an exemplary image obtained during a preliminary light emission operation according to the light emission timing of FIG. 7. As illustrated in FIG. 8, an upper portion of the frame read during the preliminary light emission operation receives light from the preliminary light emission operation reflected by the subject and is brighter accordingly. However, a bottom portion of the frame that is read after the end of the preliminary light emission operation is dark and thus reflected light from the preliminary light emission operation cannot be detected therefrom.

Figure 9:
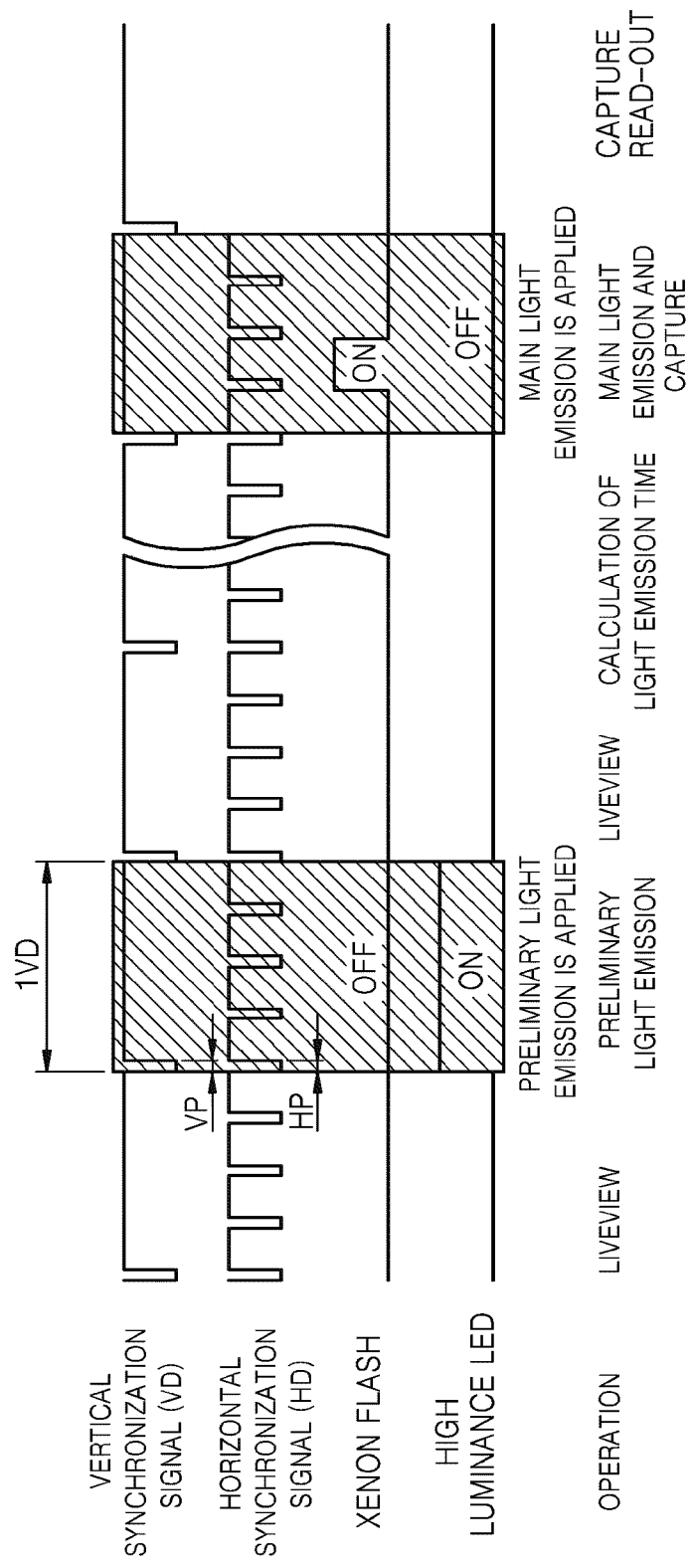
FIG. 9 is an exemplary timing diagram of light emission of a flash unit.

In the preliminary light emission operation according to the present invention, reading times may be different with respect to each of the pixels in the rolling shutter method. While a reading operation for the entire frame is performed, the preliminary light emission operation may be maintained uniformly, and thus light of the whole region around the subject may be measured and a target light amount for a main light emission operation may be calculated accurately in the rolling shutter method. FIG. 9 is an exemplary timing diagram of light emission of a flash unit. Referring to FIG. 9, the preliminary light emission may be uniformly maintained until the whole region of the frame is completely read. For example, the preliminary light emission operation may be uniformly maintained from a falling edge of a synchronization pulse VP on the vertical synchronization signal VD to a rising edge of a next synchronization pulse VP. For example, at 30 FPS, when 30 frames are read per second, a reading time 1VD granted to a unit frame may be about 33.3 msec and the preliminary light emission operation may be uniformly maintained during the reading time 1VD. In other words, if the number of frames read per second is n FPS, a reading time 1VD per frame may be 1/n sec, and preliminary light emission may be maintained during the reading time.

In the main light emission after the preliminary light emission operation, spot light emission may be performed during a time shorter than the reading time 1VD of the unit frame. In a photographing mode other than a liveview mode, the global shutter operation, in which a reading operation is performed with respect to all pixels at the same time, may be performed, and thus light having uniform luminance may be emitted over the whole region of the frame in a short light emission time. As illustrated in FIG. 2, the flash unit 180 may include the LED unit 186 and the xenon flash unit 181 which have different light emission mechanisms. In the preliminary light emission operation, the LED unit 186 may be operated, and in the main light emission, the xenon flash unit 181 may be operated. These different manners of operation may be based on individual light emission characteristics of a high luminance LED and a xenon flash. An LED typically emits a small amount of light but is capable of emitting light having uniform luminance for a relatively long time, and thus may be appropriate for the preliminary light emission operation in which a uniform amount of light is maintained during a reading time 1VD of a unit frame. On the other hand, during the main light emission, the global shutter operation, which reads all pixels at the same time, may be performed and thus a large amount of light may be needed. Thus, a xenon flash which can instantaneously provide a large amount of light by gas discharge may be operated.

Figure 10:
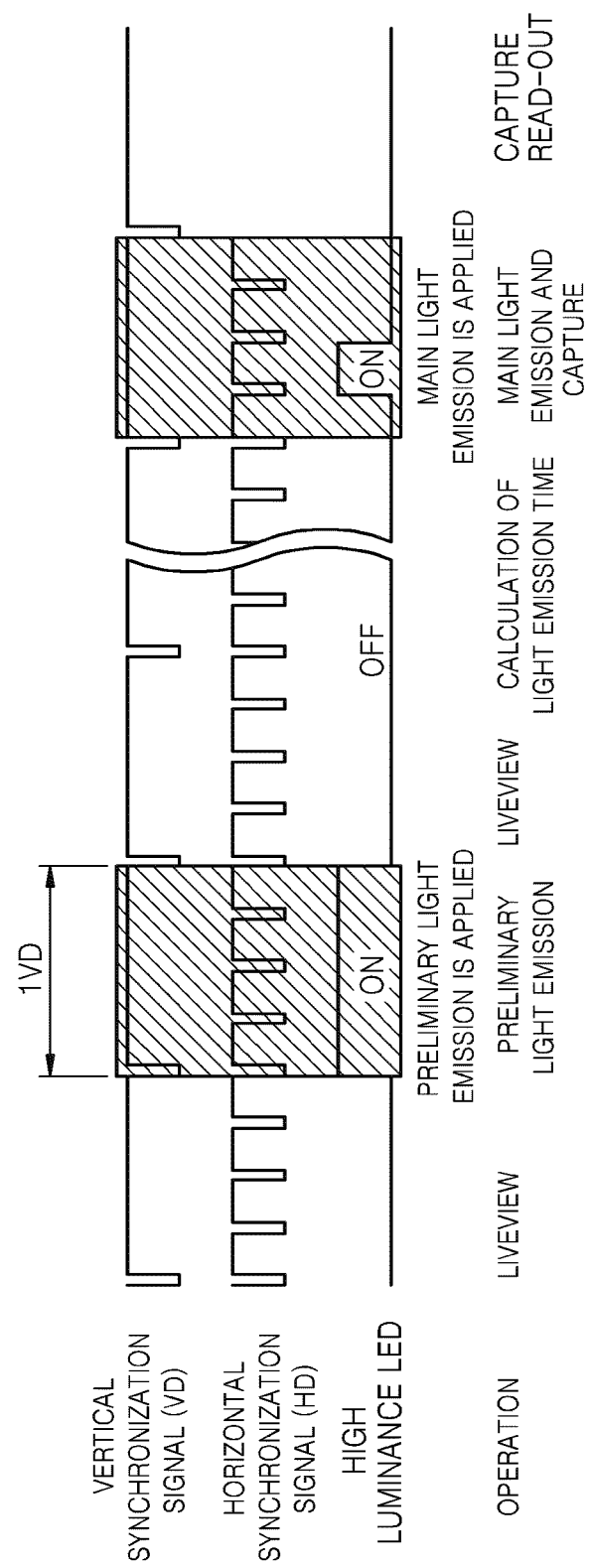
FIG. 10 is another exemplary timing diagram of light emission of a flash unit.

FIG. 10 is another exemplary timing diagram of light emission of a flash unit. As illustrated in FIG. 10, preliminary light emission may be maintained during a reading time 1VD of a unit frame, and a main light emission operation may be performed as spot light emission in a short time. The embodiment of FIG. 10 may be appropriate for the flash unit 280 that includes a high luminance LED and no xenon flash, since the flash unit 280 may perform both a preliminary light emission operation and a main light emission operation using only the high luminance LED as a light source. In the main light emission operation, a large amount of light needed for the main light emission operation may be obtained through a spot light emission operation in which a driving current of several amperes (A) at most is applied to the high luminance LED.

Figure 11:
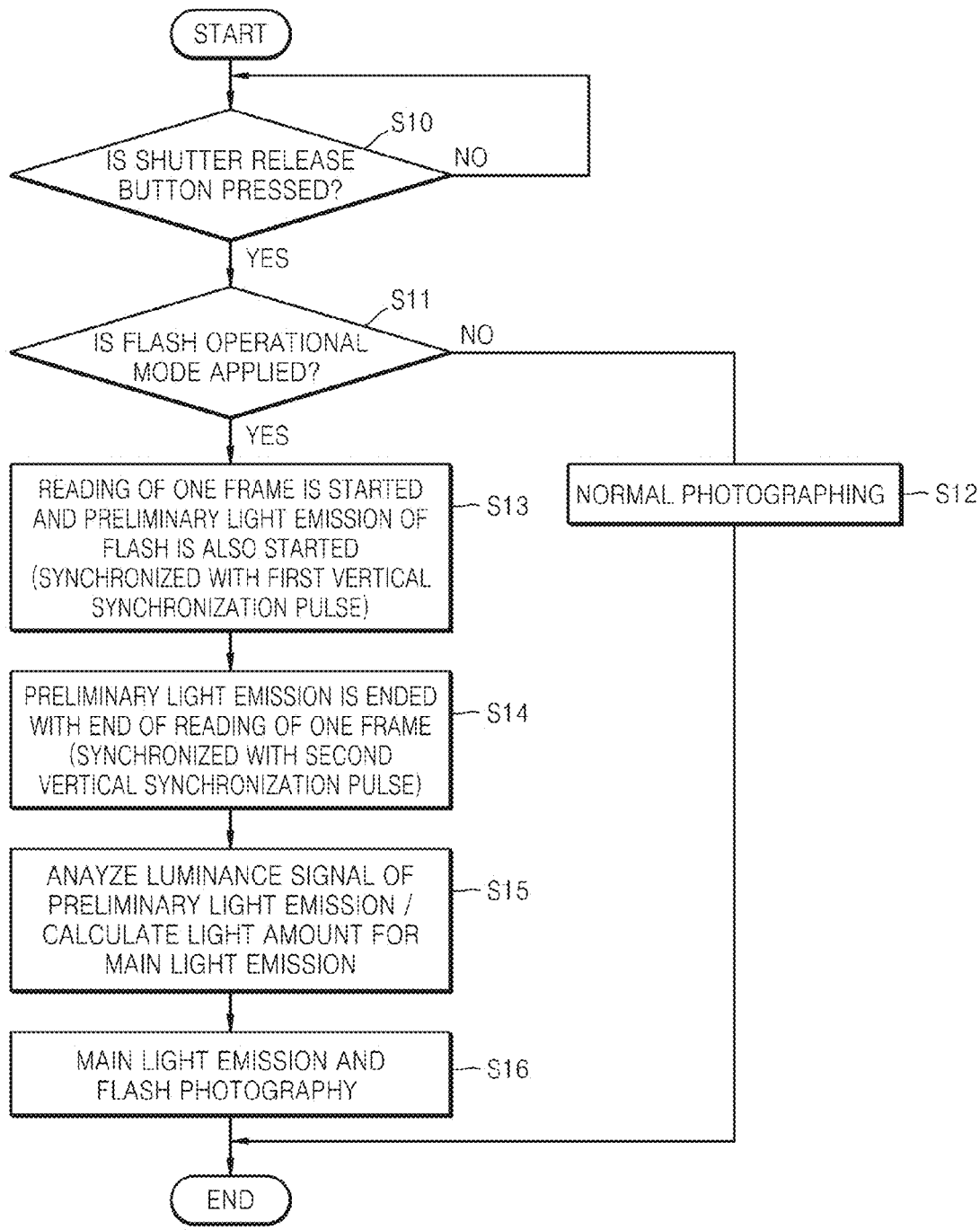
FIG. 11 is a flowchart illustrating an exemplary method of controlling a digital camera.

FIG. 11 is a flowchart illustrating an exemplary method of controlling a digital camera. After a shutter release button is pressed in operation S10, whether the digital camera is in a flash operational mode is checked in operation S11. If a determination is made that the digital camera is not in a flash operational mode in operation S11, a normal photographing operation in which a flash is not operated may be performed in operation S12. Alternatively, if a determination is made that the digital camera is in a flash operational mode in operation S11, a preliminary light emission operation for calculating a target amount of light for a main light emission operation may be started in operations S13 and S14. The preliminary light emission operation may be performed according to instructions of the digital signal processor 150, and may be uniformly maintained from a start to an end of a reading operation of one frame. For example, during one frame, a reading operation of the image sensor 120 and a preliminary light emission operation of the flash unit 180 may be synchronized with each other. That is, as the image sensor 120 starts reading a new image frame according to a synchronization pulse VP, a preliminary light emission operation of the flash unit 180 may be started at the same time in operation S13. Also, according to a synchronization pulse VP which is generated at the same time as the end of the reading operation of the image sensor 120 with respect to the frame, the preliminary light emission operation of the flash unit 180 may also be finished in operation S14. By synchronizing the preliminary light emission operation of the flash unit 180 and the reading operation of the image sensor 120 with each other, the preliminary light emission operation may be uniformly maintained while reading the whole region of the frame. Also, in the rolling shutter method, light may be measured in the whole region around the subject, thereby accurately measuring the amount of light required for the main light emission operation. Also, by analyzing an image captured during the preliminary light emission operation, an amount of light appropriate for the main light emission operation may be calculated in operation S15. The main light emission operation may be performed according to the calculated amount of light and flash photography may be performed in operation S16.

According to the exemplary digital camera and the method of controlling the digital camera described herein, as the preliminary light emission operation using a flash is synchronized with a reading operation of an image sensor, the image sensor may not be influenced by a shutter method which the image sensor supports, and an amount of light required for a main light emission operation may be calculated with high accuracy.

Functional programs, codes, and code segments for accomplishing the present invention can be easily construed by programmers of ordinary skill in the art to which the present invention pertains. Embodiments of the present invention may be implemented as one or more software modules. These software modules may be stored as program instructions executable by a processor on a computer-readable storage medium, where the program instructions stored on this medium can be read by a computer, stored in a memory, and executed by the processor. Examples of the storage medium include magnetic storage media (e.g., floppy disks, hard disks, or magnetic tape), optical recording media (e.g., CD-ROMs or digital versatile disks (DVDs)), and electronic storage media (e.g., integrated circuits (IC's), ROM, RAM, EEPROM, or flash memory). The storage medium may also be distributed over network-coupled computer systems so that the program instructions are stored and executed in a distributed fashion.

The present invention may be described in terms of functional block components and various processing steps. Such functional blocks may be realized by any number of hardware and/or software components configured to perform the specified functions. For example, the present invention may employ various integrated circuit components, e.g., memory elements, processing elements, logic elements, look-up tables, and the like, which may carry out a variety of functions under the control of one or more microprocessors or other control devices. Similarly, where the elements of the present invention are implemented using software programming or software elements, the invention may be implemented with any programming or scripting language such as C, C++, Java, assembler, or the like, with the various algorithms being implemented with any combination of data structures, objects, processes, routines or other programming elements. Furthermore, the present invention could employ any number of conventional techniques for electronics configuration, signal processing and/or control, data processing and the like. The word mechanism is used broadly and is not limited to mechanical or physical embodiments, but can include software routines in conjunction with processors, etc.

The particular implementations shown and described herein are illustrative examples of the invention and are not intended to otherwise limit the scope of the invention in any way. For the sake of brevity, conventional electronics, control systems, software development and other functional aspects of the systems (and components of the individual operating components of the systems) may not be described in detail. Furthermore, the connecting lines, or connectors shown in the various figures presented are intended to represent exemplary functional relationships and/or physical or logical couplings between the various elements. It should be noted that many alternative or additional functional relationships, physical connections or logical connections may be present in a practical device. Moreover, no item or component is essential to the practice of the invention unless the element is specifically described as "essential" or "critical".

As these embodiments of the present invention are described with reference to illustrations, various modifications or adaptations of the methods and or specific structures described may become apparent to those skilled in the art. All such modifications, adaptations, or variations that rely upon the teachings of the present invention, and through which these teachings have advanced the art, are considered to be within the spirit and scope of the present invention. Hence, these descriptions and drawings should not be considered in a limiting sense, as it is understood that the present invention is in no way limited to only the embodiments illustrated.

It will be recognized that the terms "comprising," "including," and "having," as used herein, are specifically intended to be read as open-ended terms of art. The use of the terms "a" and "and" and "the" and similar referents in the context of describing the invention (especially in the context of the following claims) are to be construed to cover both the singular and the plural. Furthermore, recitation of ranges of values herein are merely intended to serve as a shorthand method of referring individually to each separate value falling within the range, unless otherwise indicated herein, and each separate value is incorporated into the specification as if it were individually recited herein. Finally, the steps of all methods described herein can be performed in any suitable order unless otherwise indicated herein or otherwise clearly contradicted by context.

What is claimed is:

1. A digital camera comprising:
    a flash unit including a light source, the flash unit configured to emit light to illuminate a subject using a preliminary light emission operation followed by a main light emission operation;
    an image sensor including a pixel array arranged along a plurality of lines, the image sensor configured to convert an image of the subject into an electrical signal by reading an image frame corresponding to one screen using the pixel array during the preliminary light emission operation and reading another image frame corresponding to one screen during the main light emission operation; and
    a digital signal processor communicatively coupled with the flash unit and the image sensor, the digital signal processor configured to control the light emitting operation of the flash unit to maintain the preliminary light emission from a start to an end of the reading of one image frame,
    wherein the main light emission operation is performed as a spot light emission operation which is maintained for a shorter time period than the reading operation of an image frame.

2. The digital camera of claim 1, wherein the digital signal processor is further configured to synchronize the preliminary light emission operation with the reading operation of the image sensor within the one image frame.

3. The digital camera of claim 1, wherein the preliminary light emission operation is started in response to a synchronization pulse of a vertical synchronization signal, and the preliminary light emission operation is ended in response to a next synchronization pulse.

4. The digital camera of claim 1, wherein the light source of the flash unit comprises a light emitting diode, and wherein a light emission time of the light emitting diode is controlled according to connection or blocking of a driving power source.

5. The digital camera of claim 4, wherein the preliminary light emission operation and the main light emission operation are performed by operating the light emitting diode.

6. The digital camera of claim 1, wherein the light source of the flash unit comprises a xenon flash having a gas discharge structure and a light emitting diode whose light emission time is controlled according to connection or blocking of a driving power source.

7. The digital camera of claim 6, wherein the preliminary light emission operation is performed by operating the light emitting diode, and the main light emission operation is performed by operating the xenon flash.

8. The digital camera of claim 1, wherein the digital signal processor is further configured to analyze a luminance signal of an image frame obtained during the preliminary light emission operation, and calculate an amount of light required for the main light emission operation.

9. A digital camera comprising:
    a flash unit including a light source, the flash unit configured to emit light to illuminate a subject using a preliminary light emission operation followed by a main light emission operation;
    an image sensor including a pixel array arranged along a plurality of lines, the image sensor configured to convert an image of the subject into an electrical signal by reading an image frame corresponding to one screen using the pixel array, to perform the reading operation in units of frames in response to a vertical synchronization signal, and to perform the reading operation in units of lines in response to a horizontal synchronization signal; and
    a digital signal processor communicatively coupled with the flash unit and the image sensor, the digital signal processor configured to control the light emitting operation of the flash unit to start the preliminary light emission operation at a synchronization pulse of the vertical synchronization signal and end the preliminary light emission operation at a next synchronization pulse;
    wherein the main light emission is performed as a spot light emission operation which is maintained for a shorter time period than a time period between the synchronization pulses of the vertical synchronization signal.

10. The digital camera of claim 9, wherein the preliminary light emission is uniformly maintained between the synchronization pulses of the vertical synchronization signal.

11. The digital camera of claim 9, wherein the light source of the flash unit comprises a xenon flash including a gas discharge structure and a light emitting diode whose light emission time is controlled according to connection or blocking of a driving power source.

12. The digital camera of claim 11, wherein the preliminary light emission operation is performed by operating the light emitting diode, and the main light emission operation is performed by operating the xenon flash.

13. The digital camera of claim 9, wherein the digital signal processor is further configured to analyze a luminance signal of an image frame obtained during the preliminary light emission operation, and calculate an amount of light required for the main light emission operation.

14. A method of controlling a digital camera that includes a flash unit that provides a light source for photographing, and an image sensor that includes a pixel array arranged along a plurality of lines and that is configured to convert an image of the subject into an electrical signal by reading an image frame corresponding to one screen, the method comprising:
    starting a preliminary light emission operation of a flash unit;
    reading an image frame corresponding to one screen using an image sensor while maintaining the preliminary light emission operation;
    ending the preliminary light emission operation;
    calculating an amount of light required for a main light emission operation by analyzing a luminance signal of the image frame; and
    performing a main light emission operation according to the calculated amount of light,
    wherein performing the main light emission operation comprises performing a spot light emission operation which is maintained for a shorter time period than a reading operation of an image frame.

15. The method of claim 14, wherein starting the preliminary light emission operation is in response to a synchronization pulse of a vertical synchronization signal for starting the reading in units of frames, and ending the preliminary light emission operation is in response to a next synchronization pulse.

16. The method of claim 14, wherein starting the preliminary light emission operation comprises connecting a driving power source to a light emitting diode, and ending the preliminary light emission operation comprises blocking the driving power source from the light emitting diode.

17. The digital camera of claim 1, wherein the image sensor is further configured to perform a reading operation in units of frames in response to a vertical synchronization signal, and to perform a reading operation in units of lines in response to a horizontal synchronization signal.

* * * * *